United States Patent [19]

Nakajima

[11] Patent Number: 5,053,886
[45] Date of Patent: Oct. 1, 1991

[54] METHOD AND APPARATUS FOR MAGNIFYING AN IMAGE

[75] Inventor: Akio Nakajima, Osaka, Japan

[73] Assignee: Minolta Camera Kabushiki Kaisha, Osaka, Japan

[21] Appl. No.: 258,190

[22] Filed: Oct. 14, 1988

[30] Foreign Application Priority Data

Oct. 15, 1987 [JP] Japan .................. 62-262202
Oct. 15, 1987 [JP] Japan .................. 62-262203

[51] Int. Cl.⁵ ............................................ H04N 1/393
[52] U.S. Cl. .................................... 358/451; 358/448
[58] Field of Search ............... 382/47; 358/77, 451, 358/453, 448, 75, 78; 340/731

[56] References Cited

U.S. PATENT DOCUMENTS

| | | | |
|---|---|---|---|
| 3,816,664 | 6/1974 | Koch | 381/29 |
| 4,233,636 | 11/1980 | Harbaugh et al. | 358/451 |
| 4,303,948 | 12/1981 | Arai et al. | 358/451 |
| 4,370,524 | 1/1983 | Hiraguri | 381/29 |
| 4,545,070 | 10/1985 | Miyagawa et al. | 382/48 |
| 4,555,801 | 11/1985 | Miyagawa et al. | 382/44 |
| 4,631,751 | 12/1986 | Anderson et al. | 382/47 |
| 4,636,869 | 1/1987 | Tomohisa et al. | 358/77 |
| 4,675,811 | 6/1987 | Kishi et al. | 364/200 |
| 4,682,243 | 7/1987 | Hatayama | 358/451 |
| 4,694,288 | 9/1987 | Harada | 340/721 |
| 4,695,966 | 9/1987 | Takakura et al. | 364/521 |

*Primary Examiner*—Jin F. Ng
*Assistant Examiner*—Thomas D. Lee
*Attorney, Agent, or Firm*—Price, Gess & Ubell

[57] ABSTRACT

There are disclosed method and apparatus for magnifying an image with use of a single image memory.

In this system, it is checked whether or not the magnified image is rewritten into the image memory overlapped onto the original image to be magnified and, if a possible overlapping is detected, a border line on which the magnified line image is overlapped with the original line image to be magnified is calculated. In this case, the order of the magnifying processing is reversed between two areas bounded by the border line.

8 Claims, 10 Drawing Sheets

METHOD AND APPARATUS FOR MAGNIFYING AN IMAGE

BACKGROUND OF THE INVENTION

1. FIELD OF THE INVENTION

The present invention relates to a method and apparatus for magnifying an image, more particularly, a method and apparatus for magnifying an image data stored in an image memory and restoring the magnified image data into the image memory.

2. DESCRIPTION OF PRIOR ART

FIG. 1 shows a typical image editing apparatus for performing various functions such as composition, rotation, edition and magnification of an image.

The image editing apparatus 51 is connected to an external image inputting unit 49 such as an image reader and to an external memory unit 50 such as a hard disc unit. Image data from the external image inputting unit 49 and/or the external memory unit 50 is once stored into an image memory means (not shown) of the image editing apparatus 51. The stored data is read out for processing and is processed according to a designated function mode. The processed image data is displayed by an image displaying unit such as CRT and/or outputted to a printer 53 for printing an edited image. The designation of the function mode is done through a key board 54 and a CPU 55 provided in the image editing apparatus 51 controls operation thereof according to the designated function mode.

One type of the image editing apparatus does not provide a special buffer memory for processing image data of one frame other than the memory for storing image data of one frame.

In such an image editing apparatus, the magnifying of an image is done by reading out the stored image data in unit of one line sequentially from the memory, magnifying every one line data and restoring the magnified one line data into the memory. Upon restoring the magnified one line data in the memory, the position thereof can be altered in case of need.

However, this method has such a disadvantage that the stored original image is not necessarily reproduced faithfully during the magnification thereof. This is because one line data to be read out may not necessarily contain the original line data to be magnified in the case that the magnified data is restored at the position of the original line data to be read out for magnification.

FIG. 13 shows an example wherein the faithful magnification of the original image is impossible.

Assume that an image on an area A is magnified twice onto an area B including the area A. When the magnification process is started, the image of the area A is read out in unit of one line from the top line $A_1$ and magnified to restore it onto each line of the area B from the top line $B_1$. If the i-th line data $A_i$ is magnified in the state that the (i−1)-th line data $B_{i-1}$ is overlapped to the (i−2)-th and (i−1)-th line data $A_{i-2}$ and $A_{i-1}$, the magnified i-th line data $B_i$ is restored overlapped to the i-th and (i+1)-th line data $A_i$ and $A_{i+1}$.

Due to this, the (i+1)-th line data $A_{i+1}$ is altered or rewritten by the image data of the line $B_i$. Thus, the line data of the original image data after the line $A_i$ is destroyed and, therefore, the faithful magnification of the original image data becomes impossible after the line $A_i$.

This disadvantage can be avoided by using another memory having a capacity of one frame data for processing the latter. However, this method pushes up the cost of the image editing apparatus since another memory of a large capacity is needed.

SUMMARY OF THE INVENTION

An object of the present invention is to provide a method and apparatus for magnifying an original image without causing possible destroy thereof in an image editing apparatus having only one memory for storing image data.

Another object of the present invention is to provide a method and apparatus being capable of editing an original image data much more freely in the magnification mode.

A further object of the present invention is to provide a method and apparatus capable of magnifying an original image effectively with use of anamophic biased magnification method.

In order to accomplish these objects, according to one aspect of the present invention, there is provided a method for magnifying an original partial image stored on a first area of a memory for storing image information to restore a magnified partial image on a second area of the memory comprising: a step for setting locations of the first and second areas and a magnification for magnifying the original partial image; a step for judging a possible overlap between the first and second areas in accordance with data of the locations of the first and second areas and the magnification; and a step for performing either one of the following first to third magnifying methods selectively in the base of the result obtained by the foregoing judging step; said first magnifying method for magnifying the original partial image in the order from the uppermost line to the lowermost line thereof when the first and second areas overlap with each other and the lowermost line of the second area locates at a position not lower than that of the first one; said second magnifying method for magnifying the original partial image in the order from the lowermost line to the uppermost line thereof when the first and second areas overlap with each other and the uppermost line of the first area locates at a position not lower than that of the second area, and said third magnifying method for magnifying the original partial image from the uppermost line thereof to a line position after which a line image of the original partial image to be magnified is overlapped to a line image to be restored after magnification of the former line image, and, thereafter, magnifying it from the lowermost line to the border line when the first and second areas overlap with each other at least partially and both of the uppermost and lowermost lines of the first area are located between the uppermost and the lowermost lines of the second area.

Accordingly, since the first to third magnification methods are switched depending on the relationship between locations of the first and second areas, the whole of the partial original image is faithfully magnified and restored in the image memory.

According to another aspect of the present invention, there is provided an apparatus for processing image information comprising: an image memory being capable of storing a bit image of at least one frame; a reading address means for indicating addresses to the image memory from which bit information is to be read out; a writing address means for indicating addresses to the image memory into which bit information is to be written; a processing means with a buffer memory of a relatively small capacity for reading out bit information from the image memory in accordance with addresses indicated by the reading address means to write it into the buffer memory and for writing bit information into the image memory in accordance with addresses indicated by the writing address means after reading out it from the buffer memory, said processing means including a means for controlling a ratio of the speed for writing bit information into the buffer memory to the speed for reading out it from the buffer memory to magnify a target image; and a control means for determining a starting position of the process to be performed by the processing means on the basis of data regarding a location of a bit image to be processed and a location of an area wherein the processed bit image is restored and a magnification defined as a ratio of an image to be magnified to a magnified image and for enabling the processing means to perform the job thereof in accordance with the starting position, said control means determining the starting position based on a possible overlapping state between the bit image to be magnified and the magnified bit image.

In this image processing apparatus, it becomes possible to magnify a partial original image faithfully with use of a single image memory even if the area of the partial original image and the area wherein the magnified image is restored are overlapped with each other.

DETAILED DESCRIPTION OF THE PREFERRED EMBODIMENT

(A) Image magnification unit

Figure 1:
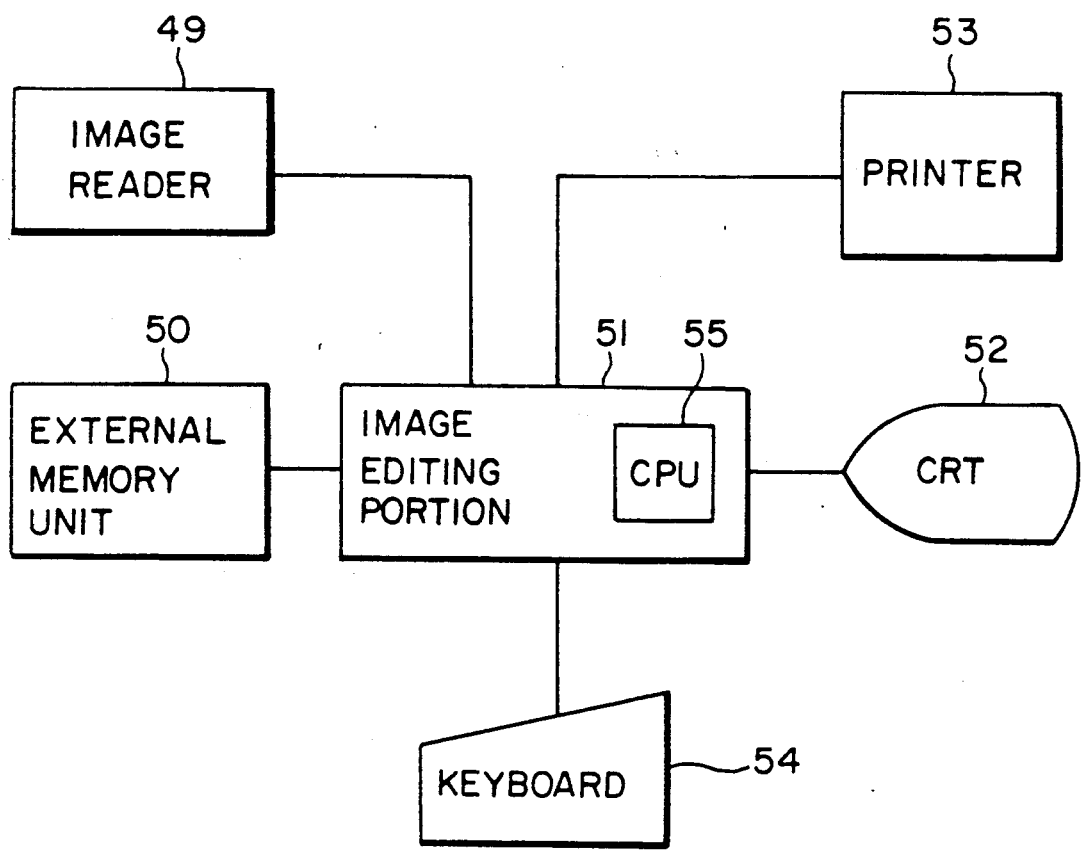
FIG. 1 is a schematic diagram of an image editing apparatus.

FIG. 1 shows an image editing apparatus which can process images in various functional modes such as composition, rotation, edition, magnification and the like. The image editing apparatus 51 is connected to an external image inputting unit 49 such as an image reader and to an external memory unit 50 such as a hard disc unit. Image data from the external image inputting unit 49 and/or the external memory unit 50 is once stored into an image memory means (not shown) of the image editing apparatus 51. The stored data is read out for processing and is processed according to a designated function mode. The processed image data is displayed by an image displaying unit such as CRT and/or outputted to a printer 53 for printing an edited image. The designation of the function mode is done through a key board 54 and a CPU 55 provided in the image editing apparatus 51 controls operation thereof according to the designated function mode.

Figure 2:
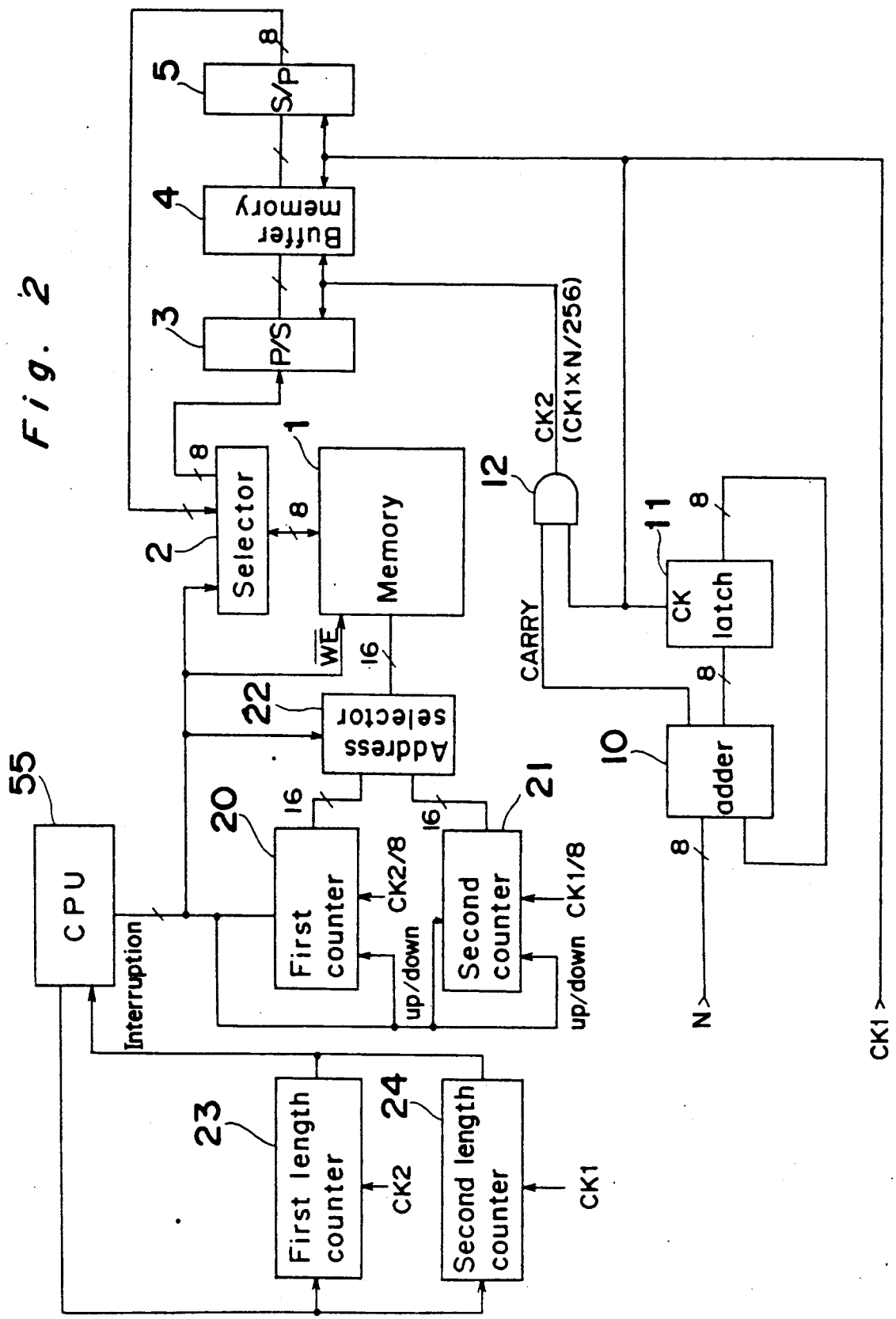
FIG. 2 is a schematic diagram of a circuit for the magnification.

FIG. 2 shows an image magnification circuit included in the image editing apparatus 51. The image magnification circuit is controlled by the CPU 55. In the image magnification circuit, the image data of 8 bits stored in an image memory 1 is read out to a buffer memory 4 through a selector 2 and a parallel-serial converter 3. The buffer memory 4 has a memory capacity of 1 bytes. The image data outputted from the buffer memory 4 is again input to the memory 1 through a serial-parallel converter 5 and the selector 2. The CPU 55 outputs a selection signal to the selector 2 which indicates whether the image data is to be input into the memory 1 or outputted therefrom. The image data stored in the memory 1 is displayed in the CRT display 52.

A clock CK1 is used for transferring the image data from the buffer memory 4 to the serial-parallel converter 5 and the frequency of the clock CK1 is held constant. On the other hand, a clock CK2 is used for transferring the image data from the parallel-serial converter 3 to the buffer memory 4 and the frequency of the clock CK2 is set at a product of the frequency of the clock CK1 with (N/256), wherein N is a parameter for indicating the magnification in the transverse direction which is input through the key board 54. The image data stored in the memory 1 is displayed in the CRT display 52.

The clock CK2 is generated by a circuit comprising an adder 10, a latch 11 and an AND gate 12. The parameter N is input to an input terminal of the adder 10 and an output signal from the latch 11 is input to another input terminal of the adder 10. The result obtained by the adder 10 is outputted to an input terminal of the latch 11. The output timing of the latch 11 is controlled by the clock CK1. When the adder 10 counts 256, it outputs a carry signal to another input terminal of the AND gate 12. The AND gate 12 gives the clock CK2 from the carry signal and the clock CK1. In other words, the frequency f(CK2) of the clock CK2 is given by a product of the frequency of the clock CK1 with N/256.

The image magnification on the memory 1 is performed by changing the frequency of the clock CK2 for reading out the image data of the memory 1 from the frequency of the clock CK1 for writing the image data into the memory 1. The magnification in the transverse direction is determined by a quotient $f(CK1)/f(CK2)$. Namely, the image data read out from the memory 1 is written into the buffer memory 4 by the clock CK2 and the image data read out from the buffer memory 4 is written into the memory 1 by the clock CK1. According to whether the carry signal is outputted or not, the image data read out newly or the image data read out at the latest timing is written into the memory 1. Therefore, the image data is written into the memory 1 so that the image is magnified by a magnification ratio of $f(CK1)/f(CK2) = 256/N$.

The magnification in the longitudinal direction will be described later.

The CPU 55 outputs the top address of each target line of the image S to be magnified and that of each line of the image D having been magnified to the first and second counters 20 and 21 upon every magnification of one line, respectively. The CPU 55 outputs the total number of the picture elements of one line of the image S to be magnified to the first length counter 23 and the total number of the picture elements of one line of the magnified image D to the second length counter 24. The first counter 20 and the second counter 21 are counted up or down by clocks CK2/8 and CK1/8 to set addresses for reading out and writing into, respectively. These clocks CK1/8 and CK2/8 are obtained by dividing the clocks CK1 and CK2 with use of dividers (not shown). The first length counter 23 and the second length counter 24 are set as down-counters which are counted down by the clocks CK2 and CK1.

On reading out the image data from the memory 1, the CPU 55 outputs a signal of high level into the $\overline{WE}$ terminal of the memory 1, and in accordance with the high level signal, an address selector 22 selects and outputs an address value of the first counter 20 into the address terminal of the memory 1. Then, the content of the selected address is stored into the buffer memory 4 through the selector 2 and the parallel-serial converter 3.

On the other hand, on writing the image data, the CPU 55 outputs a signal of low level to the $\overline{WE}$ terminal of the memory 1, and in accordance with the low level signal, the address selector 22 selects and outputs the address value of the second counter 21 to the address terminal of the memory 1. Then, the content of the buffer memory 4 is written into the memory 1 through the serial-parallel converter 5 and the selector 2.

After the above operation, the first counter 20, the second counter 21, the first length counter 23 and the second length counter 24 are counted down or up. When the first length counter 23 or second length counter 24 counts zero, the first length counter 23 or the second length counter 24 interrupts the CPU 55 to stop the magnification processing of one line temporarily. If the magnification processing is not completed after the interruption, the CPU 55 calculates the next setting value and outputs the value into the counters 20, 21, 23 and 24 to start the magnification processing again. Then, if the magnification processing of all lines is completed, it is stopped.

(B) The relationship between locations of images and the method for the image magnification In the case of the magnification from the top line or the bottom line using the same memory, there may be caused such a problem that the magnified image is written overlapped on the image remaining for the magnification.

Figure 3A:
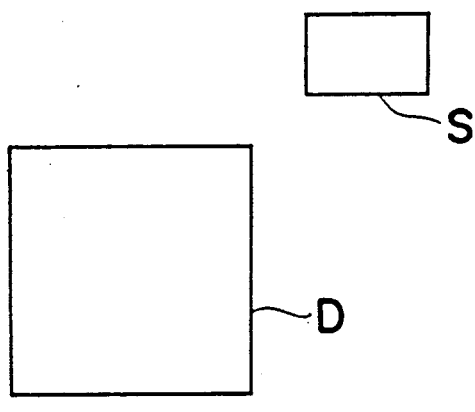
FIGS. 3a and 3b are plan views showing a relationship between locations of an image to be magnified and a magnified image, respectively.
Figure 3B:
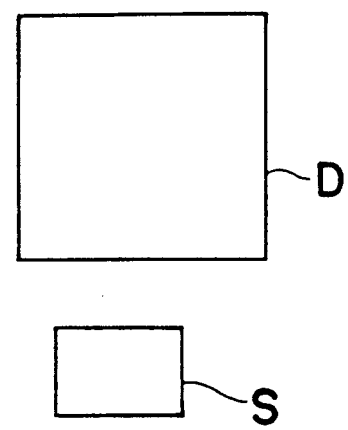

If the area D for the magnified image is set separately from that S for the image to be magnified as shown in FIGS. 3a and 3b, no problem is caused. However, if the former area D is set overlapped with the latter area S as shown in FIGS. 4a, 4b, 5a and 5b, respectively, an overlap between two images will be caused when the magnification processing is continued in the order of lines from the top or bottom line. In this case, it is impossible to obtain a correctly magnified image since a portion of the original image is rewritten by the magnified image.

This problem will be solved by the following method according to the present invention.

Figure 7A:
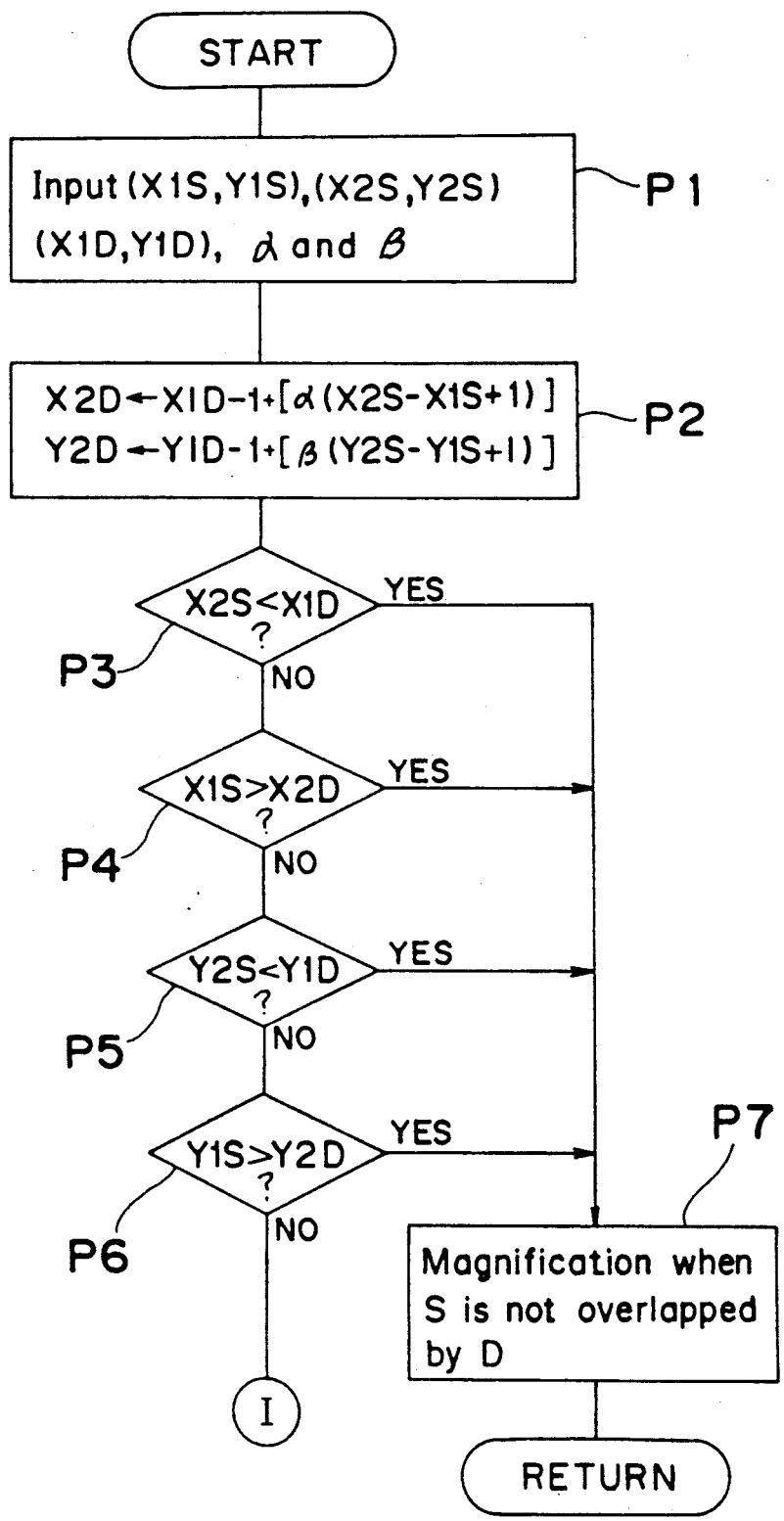
FIGS. 7a and 7b are flowcharts showing a procedure for selecting magnification methods in the preferred embodiment according to the present invention.
Figure 7B:
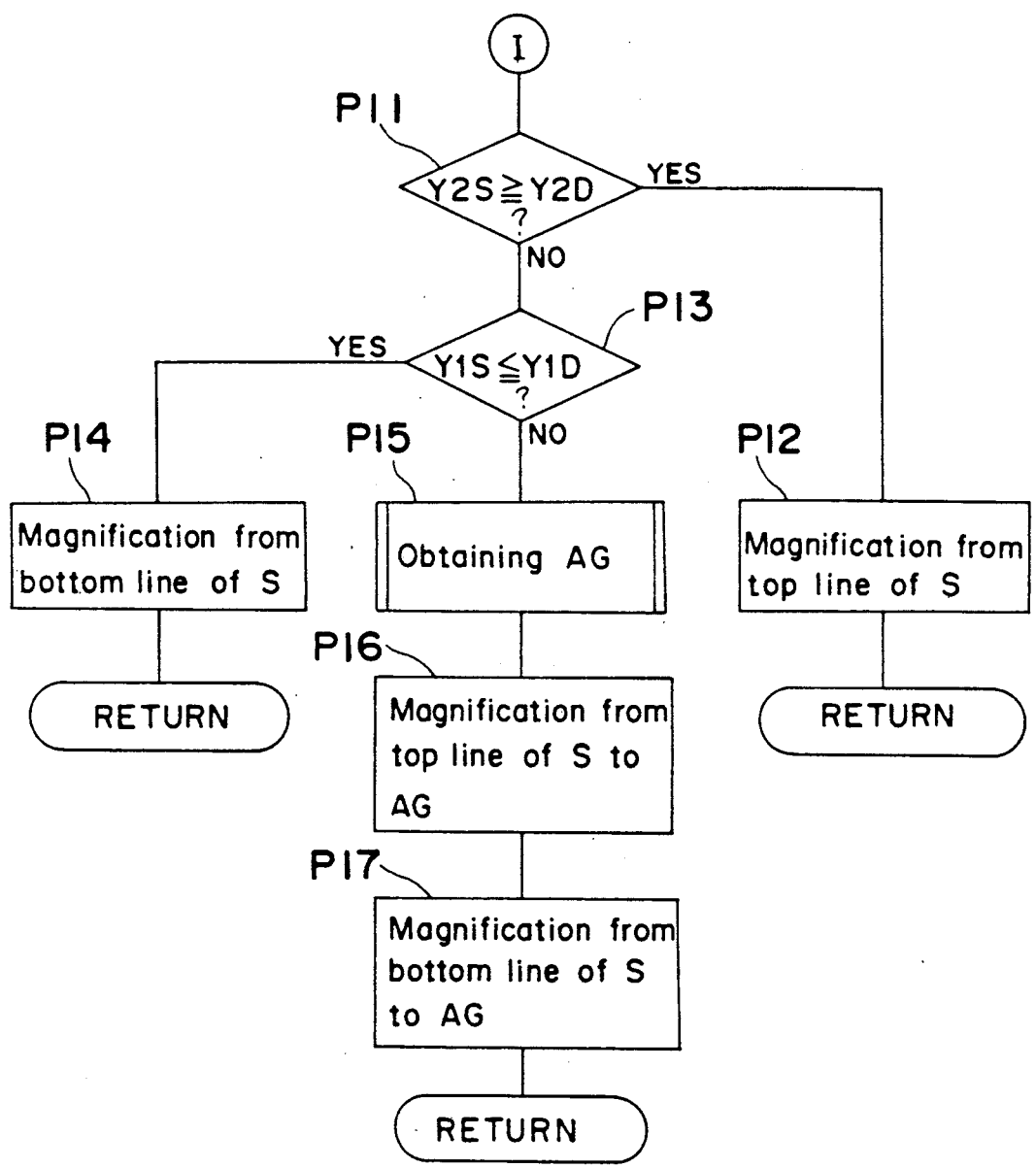

According to the present invention, the relation between a position of the area S for the original image and that D for the magnified image is checked according to a flow chart shown in FIGS. 7a and 7b.

Figure 6:
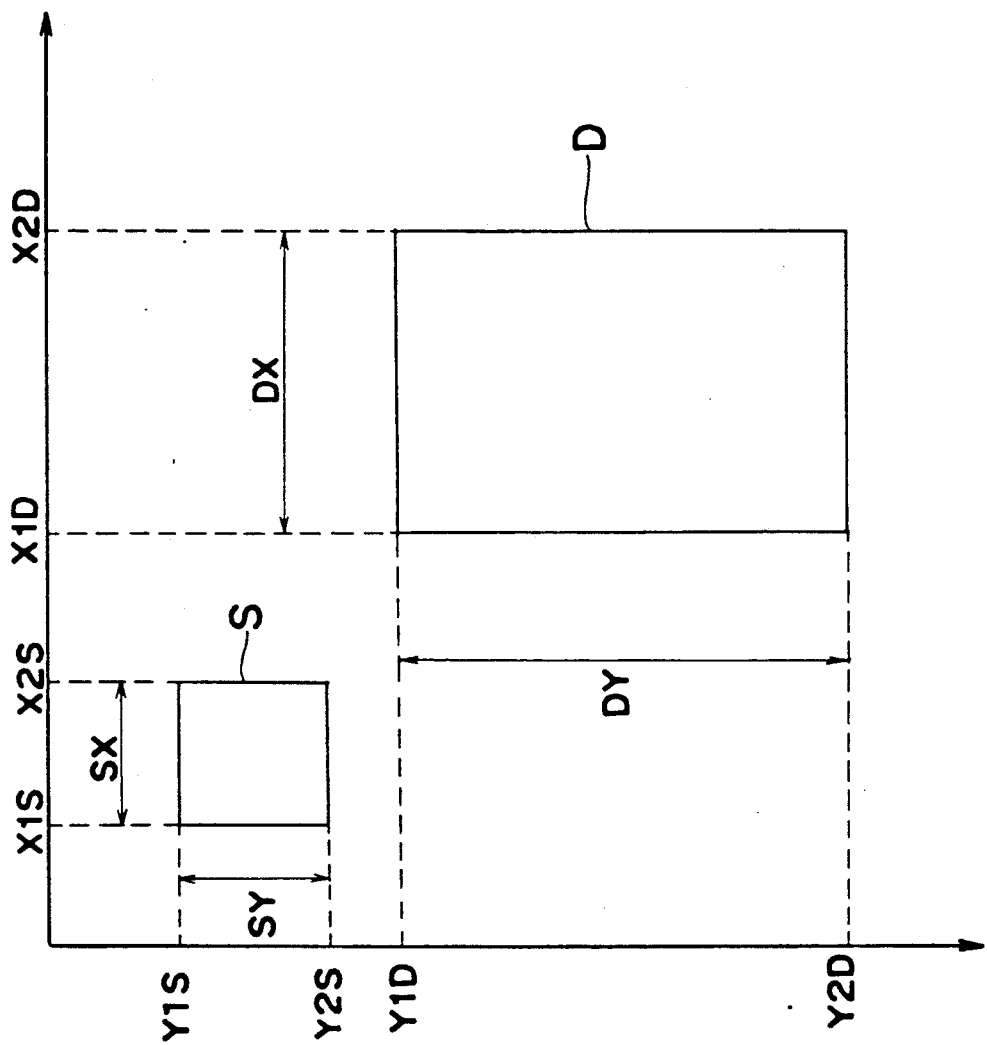
FIG. 6 shows coordinates of an image to be magnified and an image, after the magnification.

Coordinates of two diagonally opposite apexes of the area S are represented by (X1S, Y1S) and (X2S, Y2S), respectively and those of the area D are represented by (X1D, Y1D) and (X2D, Y2D), as shown in FIG. 6.

It is to be noted that the magnification $\alpha$ in the transverse direction is not necessarily equal to the magnification $\beta$ in the longitudinal direction in the anamophic magnification mode, if possible.

Assuming that respective line numbers defined between X1S and X2S, Y1S and Y2S, X1D and XX2D and Y1D and Y2D are represented by SX, SY, DX and DY, respectively, DX and DY should be integers and, therefore, these are represented as follows:

$$DX = [\alpha \cdot SX], DY = [\beta \cdot SY],$$

wherein the bracket [ ] indicates Gauss symbol for representing the maximum integer not exceeding a real number inserted therein.

Next, the procedure for checking the position relation between two areas S and D will be explained according to the flow chart shown in FIGS. 7a and 7b.

In the step P1, the position of the area S of the image to be magnified and the starting point of the area D for the image having been magnified are entered using the keyboard 54, namely, the coordinates X1S, Y1S, X2S, Y2S, X1D, and Y1D are entered at first. The parameter N for the magnification in the transverse direction and the parameter M for the magnification in the longitudinal direction are entered to set the magnification $\alpha$ in the transverse direction ($\alpha = 256/N$) and the magnification $\beta$ of the longitudinal direction ($\beta = 256/M$). In the step P2, the coordinates X2D and Y2D of the ending point of the area D are calculated by the following equations.

$$X2D = X1D - 1 + [\alpha(X2S - X1S + 1)]$$

$$Y2D = Y1D - 1 + [\beta(Y2S - Y1S + 1)]$$

In the steps P3 to P6, it is judged whether the image area S is not overlapped by the image area D. Namely, in the step P3, the relationship between the right side of the image area S and the left side of the image area D is checked. If X2S < X1D, the left side of the image S is positioned at the right hand side of the left side of the image D, then, the image area S is not overlapped by the image area D and the flow goes to the step P7. On the other hand, if X2S < X1D, the flow goes to the step P4.

In the step P4, the relationship between the left side of the image area S and the right side of the image area D is checked. If X1S>X2D, the right side of the image area D is positioned at the right hand side of the left side of the image area S. Then, the image area S is not overlapped by the image area D and the flow goes to the step P7. On the other hand, if not X1S>X2D, the flow goes to the step P5.

In the step P5, the relationship between the bottom side of the image area S and the top side of the image area D is checked. If Y2S<Y1D, the bottom side of the image area S is located above the top side of the image area D. Then, the image area S is not overlapped by the image area D, and the flow goes to the step P7. If not Y2S<Y1D, the flow goes to the step P6.

In the step P6, the relationship between the top side of the image area S and the bottom side of the image area D is checked. If Y1S>Y2D, the top side of the image area S is located under the bottom side of the image area D. Then, the image S is not overlapped by the image D, and the flow goes to the step P7. If not Y1S>Y2D, the flow goes to the step P11.

In the step P7, the normal magnification processing is performed in the case that the image area S is not at all overlapped by the image area D. In the normal magnification processing, the magnification is performed from the top line to the bottom line of the image area S in order to write the magnified image into the image area D or is performed from the bottom line to the top line of the image area S. These descending and ascending magnification processings are selectively performed.

Figure 4A:
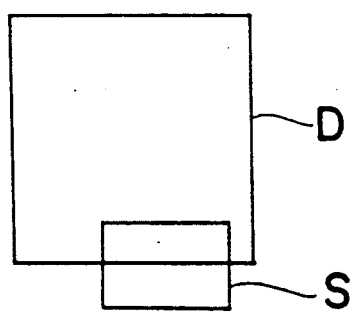
FIG. 4a is a plan veiw showing a relationship between locations of an image to be magnified and an image magnified according to a magnification starting method from the top line of the image.

In the case that the image area S is overlapped by the image area D, namely, in the case of "NO" in the step 6, the relationship between the bottom lines of the image areas S and D is checked in the next step P11. In the step P11, if Y2S≧Y2D, the bottom line of the image area S is positioned below the bottom line of the image area D as shown in FIG. 4a, then, the flow goes to the step P12 to perform the magnification method wherein each line image is magnified in the order from the top line to the bottom line of the image area S to write it into the image area D successively. On the other hand, in the step P11, if not Y2S≧Y2D, the flow goes to the step P13.

Figure 4B:
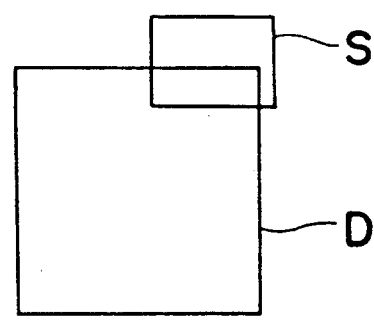
FIG. 4b is a plan veiw showing a relationship between locations of an image to be magnified and an image magnified according to a magnification starting method from the bottom line of the image.
Figure 5A:
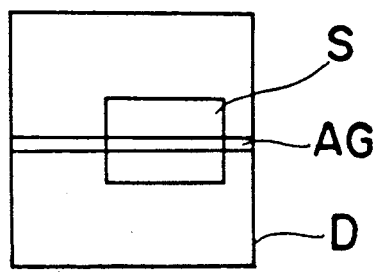
FIGS. 5a and 5b are plan views showing a relationship between locations an image to be magnified and an image magnified according to a magnification method according to the present invention, respectively.
Figure 5B:
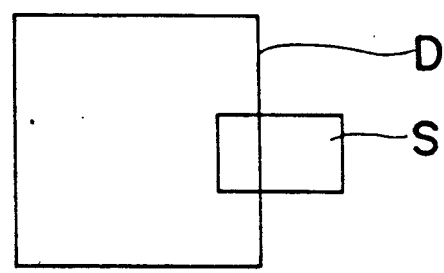

In the step P13, the relationship in the longitudinal direction between the top lines of the image areas S and D is checked. If Y1S≦Y1D, the top line of the image area D is positioned below the top line of the image area S as shown in FIG. 4b, then, the flow goes to the step P14 in order to perform the the magnification method wherein each line image is magnified in the order from the bottom line to the top line of the image area S. On the other hand, if not Y1S≦Y1D, at least one portion of the image area S is overlapped by the image area D and the image area S is included between the top line and bottom line of the image area D, then, the flow goes to step P15.

In the step P15, there is calculated a line position AG from which the image area S is overlapped by the image area D in the progress of the magnification starting from the top or bottom line. In the step P16, the magnification processing is performed from the top line of the image area S to the line AG. In the step P17, the magnification processing is performed from the bottom line of the image area S to the line AG.

Figure 8:
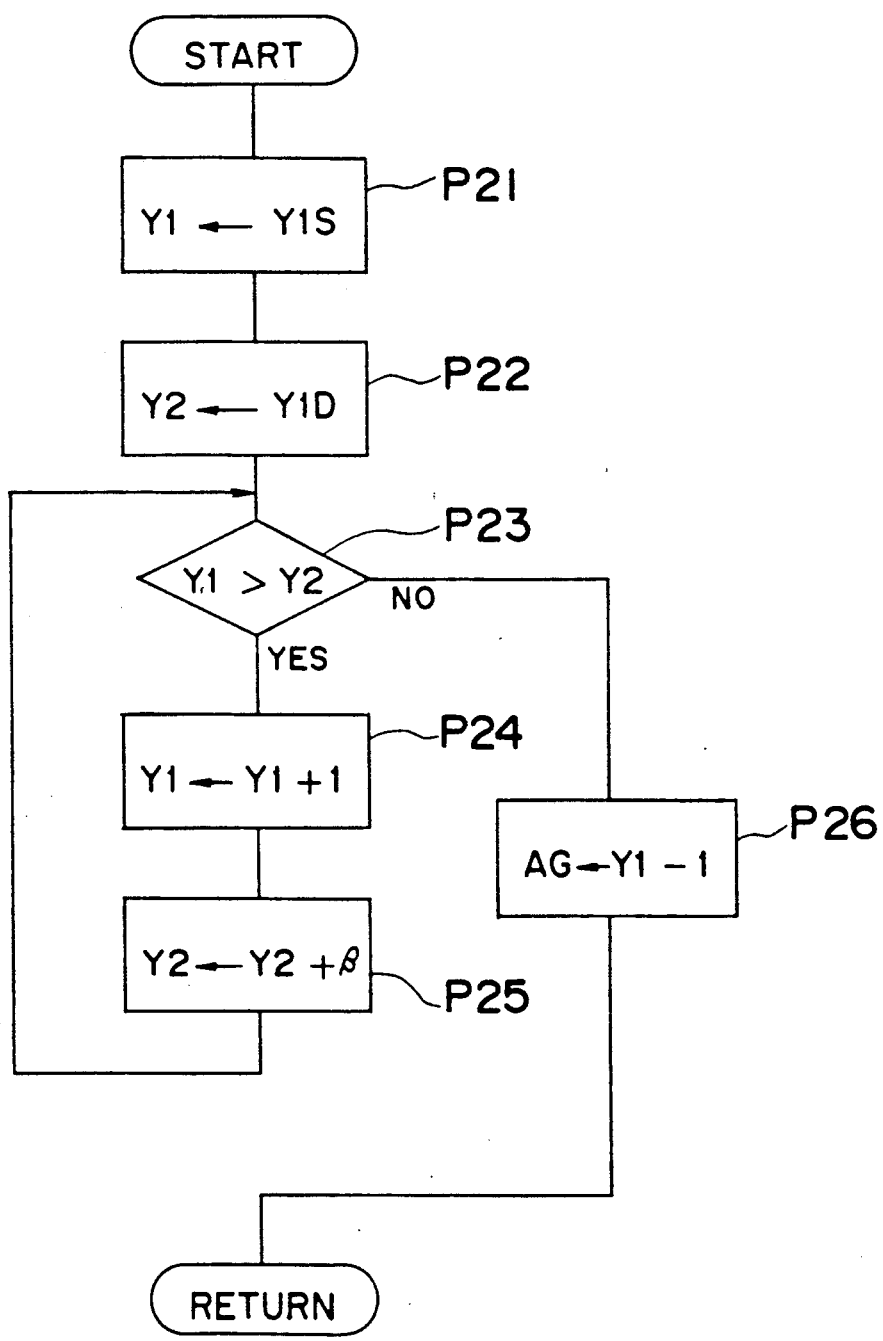
FIG. 8 is a flowchart showing a procedure for obtaining a line from which the original image is overlapped by the magnified image in the case of the location relationship as shown in FIGS. 5a and 5b, respectively.

FIG. 8 shows the procedure for obtaining the line position AG.

In the step P21, the top line Y1S of the image area S to be magnified is substituted into Y1. In the step P22, the top line Y1D of the image area D is substituted into Y2. In the step P23, if Y1>Y2, the flow goes to the step P24. In the step P24, Y1+1 is substituted into Y1, then, the flow goes to the step P25. In the step P25, Y2+β is substituted into Y2, then, the flow goes back to the step 23. In the step 23, if not Y1>Y2, the flow goes to the step P26. In the step P26, Y1−1 is substituted into AG, then, the processing for obtaining the line number AG is completed.

(C) The operation of the image processing circuit

Action of the counters 20, 21, 23 and 24 upon performing either one of three magnification methods to be executed in the steps P12, P14 and P15 to P17 will be explained hereinafter.

Figure 9:
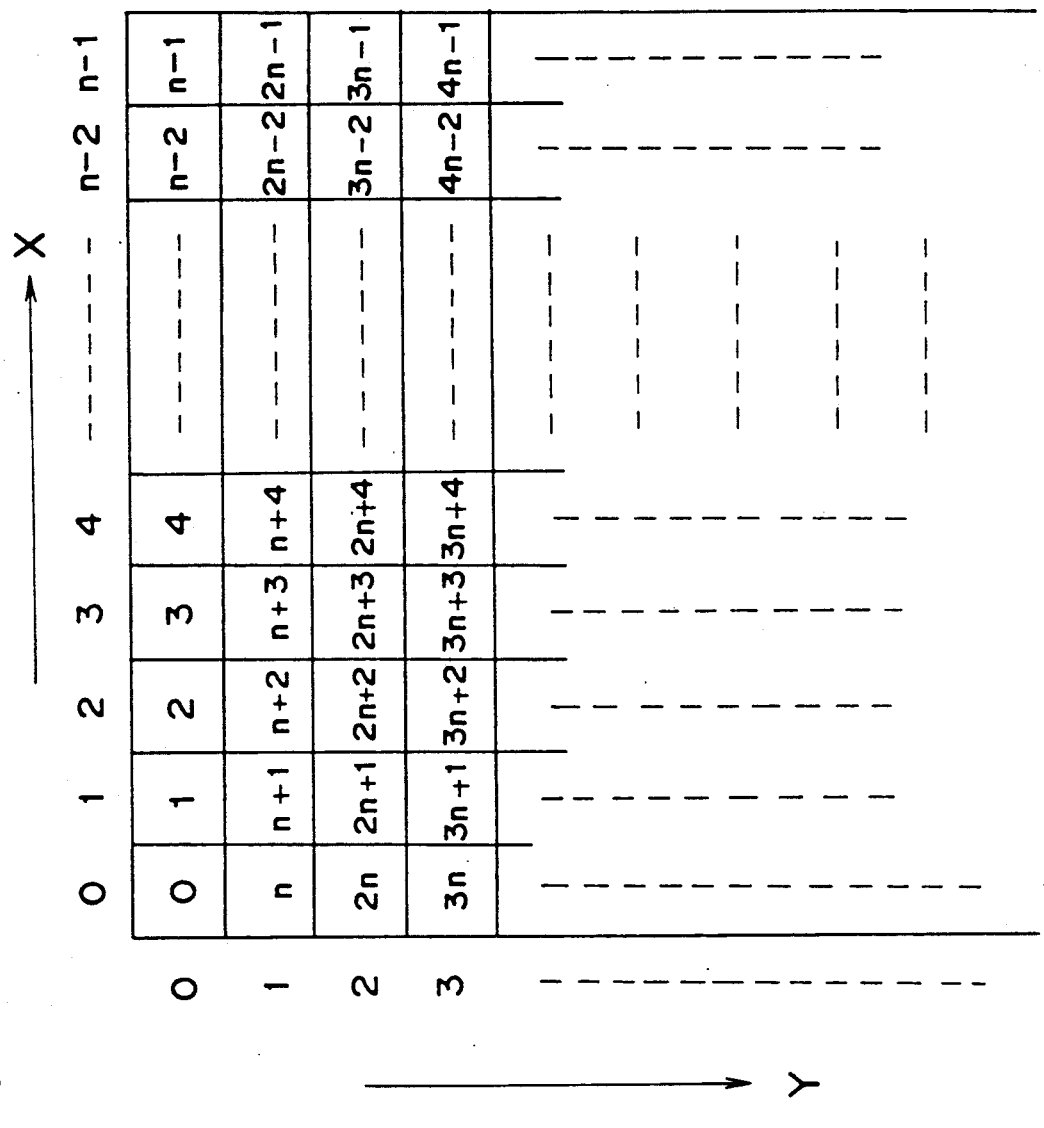
FIG. 9 is an explanative view showing a relationship between addresses and positions of an image memory.

First of all, the procedure by the CPU 55 for setting the address is explained. In the image memory 1 of the preferred embodiment, the address is assigned successively from the top left corner edge of the image area shown in FIG. 6, namely, when the X-Y coordinate of FIG. 6 is introduced and the maximum number of the picture elements in the X direction of the whole memory area is n, the address of a position represented by a coordinate (X,Y) on the memory 1 is determined by (nY+X), as shown in FIG. 9. The CPU 55 sets the address utilizing this relation.

Figure 10:
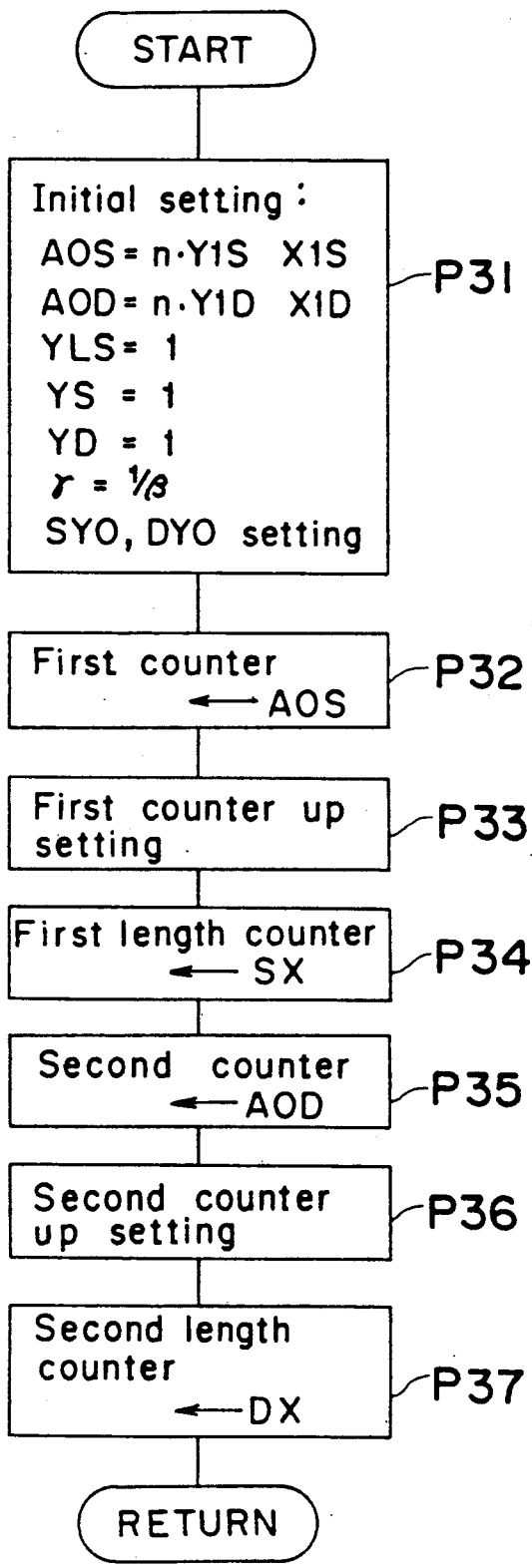
FIG. 10 is a flowchart showing a procedure of an initial setting of a CPU.
Figure 11:
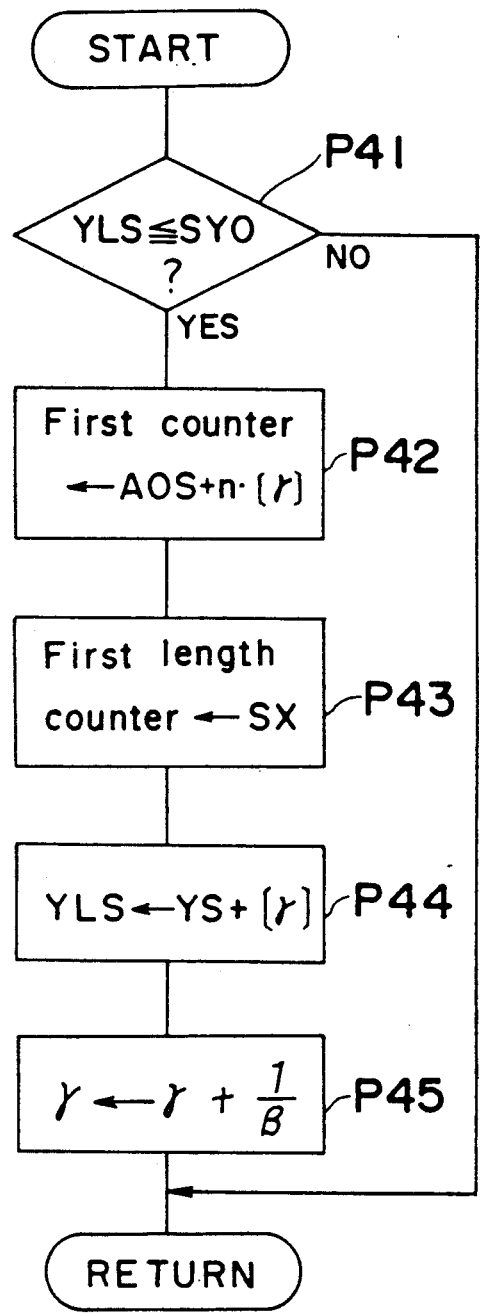
FIG. 11 is a flowchart showing a procedure of the CPU interrupted by a first length counter.
Figure 12:
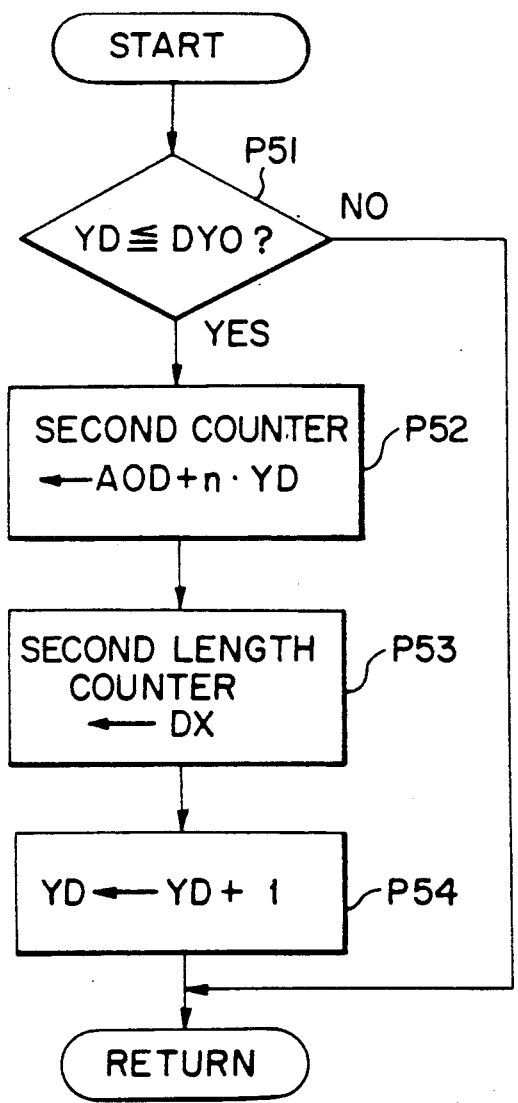
FIG. 12 is a flowchart showing a procedure of the CPU interrupted by a second length counter.
Figure 13:
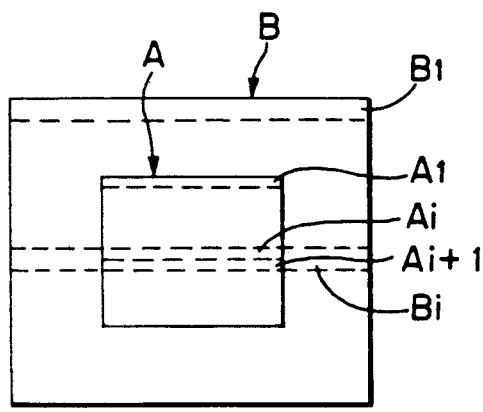
FIG. 13 is a plan view showing a relation between an image to be magnified and an image magnified according to the prior art.

FIGS. 10 to 12 are flowcharts for setting the address of the CPU 55 in the case of the magnification method starting from the top line.

In the step P31, the initial setting is performed. Namely, the top address A0S of the top line of the image area S is set at (n×Y1S+X1S) and the top address A0D of the top line of the image D is set at (n×Y1D+X1D). Parameters YLS, YS and YD are set at "1", respectively. The parameters YLS and YD represent numbers of lines being processed at the present when counted from the top lines of the image areas S and D, respectively. Furthermore, a parameter γ is set at an inverse of the magnification β in the longitudinal direction. In the initial setting, a line width SY0 of the image S and a line width DY0 of the image D are also set. In case of the magnification starting from the top line, the SY0 and DY0 are set as follows;

SY0=SY=Y2S−Y1S+1

DY0=DY=Y2D−Y1D+1.

On the other hand, in the case of the magnification from the top line to the line AG, they are initialized as follows;

SY0=AG−Y1S+1

DY0=AG−Y1D+1.

In the step P32, the address A0S is set into the first counter 20. In the step P33, the first counter 20 is set as an up counter. In the step P34, the total picture element number SX=X2S−X1S+1 of one line of the image area S is set into the first length counter 23. In the step P35, the address A0D is set into the second counter 21. In the step P36, the second counter 21 is set as an up counter. In the step P37, the total picture element number DX=X2D−X1D+1 of one line of the image area D is set into the second length counter 24. Then, the initial setting for the CPU 55 is completed.

FIG. 11 is a flowchart for setting an address of each of magnified lines when the CPU 55 is interrupted by the first length counter 23, namely, when the process is performed stepped forward by one line in the Y direction. In the flowchart, the address to be set into the first counter 20 is given depending on the magnification $\beta$ in the longitudinal direction. When the magnification $\beta$ in the longitudinal direction is different from the magnification $\alpha$ in the transverse direction, an anamophic biased magnification is performed.

In the step P41, it is checked whether YLS is smaller than or equal to the SY0. If YLS≦SY0, the flow goes to the step P42. On the other hand, if not YLS≦SY0, the flow goes out from the flowchart of FIG. 11 since this indicates the completion of the present magnification. In the step P42, the top address (AOS+n[γ]) of the line to be magnified is set into the first counter 20 in accordance with the magnification $\beta$ in the longitudinal direction, wherein $\gamma=1/\beta$. In the step P43, the total picture element number SX of one line of the image area S is set into the first length counter 23. In the step P44, in order to set the next line number of the image area S to be magnified which is counted from the top line of the image area S, YS+[γ] is substituted into the parameter YLS. The reason why the parameter YS is added is to prevent YLS from becoming zero since the parameter YS is set at "1" in the initial setting. Next, in the step P45, $\gamma+1/\beta$ is substituted into the parameter $\gamma$, whereby the step P45 is performed in order to change the value set into the first counter 20 and the value of the parameter YLS are renewed in accordance with the magnification.

The magnification of image in the Y direction is performed by changing the Y address according to the software shown in the flowchart of FIG. 11. An example of the change of the Y address will be described below. Assuming that the parameter A0S is "0", A0D is "100", $\beta$ is "1.5" and $\gamma$ is "1/1.5"; the address in the Y direction to be set into the first counter 20 is changed every time of the interruption as follows;

1,1,2,3,3,4,5,5,6, 7, 7, 8, 9, 9,10
1,2,3,4,5,6,7,8,9,10,11,12,13,14,15

The numbers of the above first row represent the line numbers of the image areas to be magnified and the numbers of the above second row represent the numbers of lines into each of which each line image corresponding to respective line number of the first row is to be written. It is to be noted that the first line image is processed according to the initial setting and the line images after the second line are processed according to the flowchart shown in FIG. 11. Accordingly, in this example, the original image of 10 lines is magnified into an image having 15 lines.

Next, the flow chart shown in FIG. 12 is explained. This flow chart is executed when the CPU 55 is interrupted by the second length counter 24, namely, whenever the process is advanced by one line in the Y direction. The flowchart shows the setting procedure for the address which is magnified every line.

In the step 51, it is checked whether or not the YD is not larger than the DY0 which is set in the initial setting. If YD≦DY0, the flow goes to the step P52. On the other hand, if not YD≦DY0, the flow goes out from the flowchart of FIG. 12 since this indicates the completion of the magnifying process. In the step P52, the top address (A0D+n×YD) of the line into which the magnified line image is to be written next is set into the second counter 21. In the step P53, the total picture element number DX of one line of the image area D is set into the second length counter 24. In the step P54, in order to set the number of the line of the image area D to be written thereinto, when counted from the top line of the image area D, YD+1 is substituted into YD. Thus, the setting processing by the CPU 55 is completed in the case that the CPU 55 is interrupted by the second length counter 24 and the flow returns.

FIGS. 10 to 12 show the case of the up counting, on the other hand, the case of the down counting is performed as well as the case of the up counting by changing the sign etc. Accordingly, the flowcharts for the latter case are abbreviated.

When the CPU 55 sets the address value as mentioned above, the image magnification circuit of FIG. 3 operates as follows. In the case of the magnification from the top line, the first counter 20 for setting the address of the image area S and the second counter 21 for setting the address of the image area D are set as the up counters by the CPU 55, wherein the initial values A0S of the addresses of the image area S are n×Y1S+X1S, n×(Y1S+1)+X1S, ..., n×Y2S+X1S, respectively, and the initial values A0D of the addresses of the image area D are n×Y1D+X1D, n×(Y1D+1)+X1D, ..., n×Y2D+X1D, respectively. The initial picture element number SX(=X2S−X1S+1) of one line of the image area S is set into the first length counter 23 and the initial picture element number DX(=X2D−X1D+1) of one line of the image area D is set into the second length counter 24. The clock CK2/8 is input into the first counter 20 and the clock CK2 is input into the first length counter 23. The clock CK1/8 is input into the second counter 21 and the clock CK1 is input into the second length counter 24. Since the first counter 20 and the second counter 21 are set as the up counters, and incremented in accordance with the clocks CK2/8 and CK1/8, respectively. Then, the magnification from the top line is performed in order. On the other hand, the first length counter 23 and the second length counter 24 are set as the down counters and, when the counting value of either of the first length counter 23 and the second length counter 24 becomes 0, the CPU 55 is interrupted thereby and the magnification processing is stopped temporarily. Next, CPU 55 sets the initial values into the first and second counters 20 and 21, respectively. Namely, the next top address of the magnification line of the image area S to be magnified and the next top address of the magnification line of the image area D are set into the first and second counters 20 and 21, respectively. Then, the picture element number SX of one line of the image area S to be magnified and the picture element number DX of one line of the image area D are set into the first length counter 23 and the second length counter 24, respectively. Next, the similar processing is performed as well as the above-mentioned processing, again. The above processing is performed until the processing line becomes the bottom line DY0 of the image D calculated previously. Then, the magnification processing is completed.

In the case of the magnification starting from the bottom line, since the top address of each of lines becomes the address of the rightmost picture element in FIG. 6, the first counter 20 for setting the address of the image area S and the second counter 21 for setting the address of the image area D are set as down counters, wherein the initial values A0S of the addresses of the image area S are $n \times Y2S + X2S$, $n \times (Y2S-1) + X2S$, . . ., $n \times Y1S + X2S$, respectively and the initial values A0D of the addresses of the image area D are $n \times Y2D + X2D$, $n \times (Y2D-1) + X2D$, . . ., $n \times Y1D + X2D$, respectively. The total picture element number SX of one line of the image area S and the total picture element number DX of one line of the image area D are set into the first length counter 23 and the second length counter 24, respectively, as well as the case of the magnification starting from the top line. The clocks are also inputted into the counters 20, 21, 23 and 24, respectively. In the case of the magnification from the bottom line, the steps in the flowcharts shown in FIGS. 10 to 12 are altered as follows. That is, in the step P31, $A0S = n \times Y2S + X2S$ and $A0D = n \times Y2D + X2D$. In the step P33 and P36, the first counter 20 and the second counter 21 are set as the down counters. In the step P42, $A0S - n \times [\gamma]$ is set into the first counter 20 and in the step P52, $A0D - n \times YD$ is set into the second counter 21.

In the case that the magnification process is executed from the top line to the line AG at first, and, thereafter, is started from the bottom line, it is controlled as follows.

First of all, the first counter 20 and the second counter 21 are set as the up counters by the CPU 55. The total picture element number SX of one line of the image area S and the total picture element number DX of one line of the image area D are set as the initial values into the first length counter 23 and the second length counter 24, respectively. $A0S = n \times Y1S + X1S$ is set into the first counter 20 and $A0D = n \times Y1D + X1D$ is set into the second counter 21. The first length counter 23 and the second length counter 24 are down counted by the clocks CK2 and CK1, respectively. When the count value of the counter 23 or 24 becomes zero, the magnification is interrupted and the processing of the CPU 55 is stopped temporarily, then, the top addresses of the next lines of the image areas S and D are set into the first counter 20 and the second counter 21 by the CPU 55, respectively. The above processing is performed repeatedly to perform the magnification from the top line of the image area D to the line $AG-1$, then, the processing of the magnification is stopped.

Next, as well as the case of the magnification from the bottom line, the address ($A0S = n \times Y2S + X2S$) of the last picture element on the bottom line of the image area S is set into the first counter 20 by the CPU 55 and the address ($A0D = n \times Y2D + X2D$) of the last picture element on the bottom line of the image area D is set into the second counter 21 by the CPU 55. And also, the first counter 20 and the second counter 21 are set as down counters and the total number SX of the picture elements of one line of the image area S is set as an initial value into the first length counter 23 and the total number DX of the picture element of one line of the image area D is set as an initial value into the second length counter 24. Then, the first and second length counters 23 and 24 are down counted, if the value of either of the counters 23 and 24 becomes zero, the CPU 55 is interrupted and the processing of the magnification is stopped temporarily. Then, the top address $A0S-n\times[\gamma]$ of the next line of the image area S is set into the first counter 20 and the top address $A0D-n \times YD$ of the next line of the image area D is set into the second counter 21. The numbers SX and DX are set into the first and second length counters 23 and 24, respectively. The above processing is performed repeatedly to complete the magnification from the bottom line to the line AG of the image area D. As a result, the processing of the magnification from the top line to the bottom line of the image area S is completed.

In the preferred embodiment, since the processing of the magnification is performed on the same memory, the magnification starting from the top line, the magnification starting from the bottom line, the magnification from the top line to the line AG and the magnification from the bottom line to the line AG are switched in the processing of the magnification. However, the memory for storing the magnified image may be provided separately from the memory for storing the original image. The separate memories can be used for the anamophic biased magnification. In the case that the separate memories are used, it is not necessary to switch the magnification method. Accordingly, if the processing of the magnification can be performed by designating the position of area for storing the magnified image and any magnifications in the longitudinal and transverse directions, any step for the magnification can be used.

In the preferred embodiment, since the buffer memory 4 processes the data of 8 bits, the buffer memory 4 has a capacity of at least 8 bits. However, the buffer memory 4 may have the capacity for storing the data of the one line.

In the preferred embodiment, the processing of the magnification is described above, however, the processing method of the present invention can be applied to the processing that the magnification of the image is not changed and only the position of the image is changed.

Further, in the preferred embodiment, the magnifying processing is done from the top line to the AG line at first and thereafter, from the bottom line to the AG line in the case that the original image area S is overlapped as a whole at least in the longitudinal direction by the image area D, however, the order of the magnifying processing is reversible.

In the preferred embodiment, the processing of anamophic biased magnification is described, however, the present invention can be applied to the case of $\alpha = \beta$, namely, the case that the magnification rate M of the longitudinal direction is equal to the magnification rate N of transverse direction.

The preferred embodiments described herein are illustrative and not restrictive, the scope of the invention being indicated by the appended claims and all variations which come within the meanings of the claims are intended to be embraced herein.

What is claimed is:

1. A method for magnifying an original partial image stored on a first area of a memory for storing image information to restore a magnified partial image on a second area of the memory comprising:

a step for setting locations of the first and second areas and a magnification for magnifying the original partial image;

a step for judging a possible overlap between the first and second areas in accordance with data of the locations of the first and second areas and the magnification; and a step for performing either one of the following first to third magnifying methods selectively in the base of the result obtained by the foregoing judging step;

said first magnifying method for magnifying the original partial image in the order from the uppermost line to the lowermost line thereof when the first and second areas overlap with each other and the lowermost line of the second area locates at a position not lower than that of the first one;

said second magnifying method for magnifying the original partial image in the order from the lowermost line to the uppermost line thereof when the first and second areas overlap with each other and the uppermost line of the first area locates at a position not lower than that of the second area, and said third magnifying method for magnifying the original partial image from the uppermost line thereof to a border line position after which a line image of the original partial image to be magnified is overlapped to a line image to be restored after magnification of the former line image, and, thereafter, magnifying it from the lowermost line to the border line when the first and second areas overlap with each other at least partially and both of the uppermost and lowermost lines of the first area are located between the uppermost and the lowermost lines of the second area.

2. Method as claimed in claim 1, in which the last step is performed by reading out the original partial image from the memory in unit of a predetermined data amount and by writing the read image into the memory at a writing speed which is predetermined relative to the reading speed in accordance with the designated magnification.

3. Method as claimed in claim 2, in which the magnification to be set is equal to or larger than one.

4. Method as claimed in claim 3, in which the magnification is set separately in the direction of the line image and in the direction orthogonal thereto.

5. An apparatus for processing image information comprising:

an image memory being capable of storing a bit image of at least one frame;

a reading address means for indicating addresses to the image memory from which bit information is to be read out;

a writing address means for indicating addresses to the image memory into which bit information is to be written;

a processing means with a buffer memory of a relatively small capacity for reading out bit information from the image memory in accordance with addresses indicated by the reading address means to write it into the buffer memory and for writing bit information into the image memory in accordance with addresses indicated by the writing address means after reading out it from the buffer memory, said processing means including a means for controlling a ratio of the speed for writing bit information into the buffer memory to the speed for reading it out from the buffer memory to magnify a target image; and a control means for determining a starting position of the process to be performed by the processing means on the basis of data regarding a location of a bit image to be processed and a location of an area wherein the processed bit image is restored and a magnification defined as a ratio of an image to be magnified to a magnified image and for enabling the processing means to perform the job thereof in accordance with the starting position, said control means determining the starting position based on a possible overlapping state between the bit image to be magnified and the magnified bit image.

6. Apparatus as claimed in claim 5, in which the control means determines the starting position of the process in unit of one line of the bit image and controls the processing means so as to perform either one of the following first to third magnifying means selectively;

said first magnifying means for magnifying the original partial image in the order from the uppermost line to the lowermost line thereof when the first and second areas overlap with each other and the lowermost line of the second area locates at a position not lower than that of the first one;

said second magnifying means for magnifying the original partial image in the order from the lowermost line to the uppermost line thereof when the first and second areas overlap with each other and the uppermost line of the first area locates at a position not lower than that of the second area, and said third magnifying means for magnifying the original partial image from the uppermost line thereof to a border line position after which a line image of the original partial image to be magnified is overlapped to a line image to be restored after magnification of the former line image, and, thereafter, magnifying it from the lowermost line to the border line when the first and second areas overlap with each other at least partially and both of the uppermost and lowermost lines of the first area are located between the uppermost and the lowermost lines of the second area.

7. Apparatus as claimed in claim 5, in which the control means controls the reading address means, the writing address means and the means for altering the ratio of the reading speed to the writing speed.

8. Apparatus as claimed in claim 5, further comprising a setting means for setting a first magnification in a direction of a line along which bits of the bit image are aligned and a second magnification in a direction orthogonal to said line separately, wherein said first magnification is supplied to said processing means to determine a ratio of a speed for writing bit information to $\beta$ speed for reading bit information, and said second magnification is supplied to said writing address means to generate a writing address of said image memory.

* * * * *